FREQUENCY AND PHASE CONTROLLED SYNCHRONIZATION CIRCUIT

Filed April 17, 1963 2 Sheets-Sheet 1

INVENTORS
HANS W. GSCHWIND
RUDOLF H. HUEBEL
BY
Wade Koontz
ATTORNEY

FREQUENCY AND PHASE CONTROLLED SYNCHRONIZATION CIRCUIT

Filed April 17, 1963 2 Sheets-Sheet 2

INVENTORS
HANS W. GSCHWIND
RUDOLF H. HUEBEL
BY
Wade Koontz
ATTORNEY

3,271,688
FREQUENCY AND PHASE CONTROLLED SYNCHRONIZATION CIRCUIT

Hans W. Gschwind and Rudolf H. Huebel, Alamogordo, N. Mex., assignors to the United States of America as represented by the Secretary of the Air Force Filed Apr. 17, 1963, Ser. No. 273,795
1 Claim. (Cl. 328—55)

Figure 1:
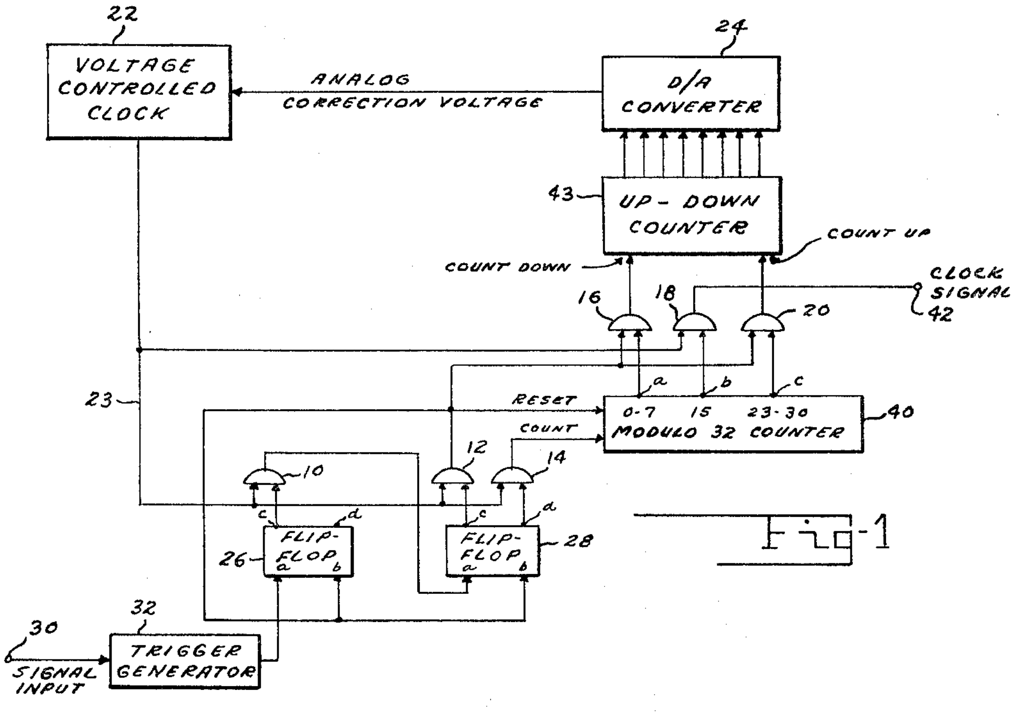

The invention described herein may be manufactured and used by or for the United States Government without the payment to us of any royalties thereon.

This invention relates to a synchronization circuit and, particularly, to a circuit for obtaining a pulse bit rate in synchronism with a source of primary signals originating from pulse code modulated (PCM) transmission.

In PCM telemetry data signals representing analog values are sampled by a multiplexer in a repetitive sequential manner producing a series of pulses whose amplitudes represent the levels of signals from successive channels. These pulses are encoded in a high-speed voltage-to-digital converter and each sampling pulse is converted to a series of binary digits which, in binary notation, represent the magnitude of the data signal represented by the pulse. Each sampled pulse therefore is now described by the presence or absence of binary digits whose level is established between zero and full scale, that is, one level represents a "1" bit and the other level represents a "0" bit. When a given analog sample is present at the input of the encoder a series of timing pulses or commands from a programmer drive the encoder through a complete cycle to convert the analog sample into a binary coded digital word. A time base generator which contains a very stable clock rate oscillator provides all timing references for the programmer and all timing functions as well as the synchronization pattern logic depend on the clock rate. For example, the clock rate oscillator provides the pulses which first advance the multiplexer to a new analog data sample, and then produces the sequence of pulses necessary to drive the encoder through the complete encoding cycle before advancing the multiplexer to the next sample.

Since PCM telemetry is transmitted in binary form it is not necessary for the receiving station to recognize pulse amplitudes but only to recognize the presence or absence of pulses to define the data signals. A number of different waveforms are used to represent the "1" and "0" bits. One commonly used is the non-return-to-zero mode (NRZ) characterized by a train of signal levels in which "1" bits are represented by a change in level in either direction and "0" bits are represented by the absence of a change in level. To recover the bit rate of the incoming PCM wave the receiver employs a bit synchronizer which must phase-lock on and track the bit rate. The bit synchronizer compares the incoming signal with its own oscillator and its frequency is adjusted to produce negligible phase difference between the changes in level of the incoming data and its own oscillator signals. A set of bit rate pulses is thus reconstructed from the incoming signal which is positioned in a known time relation to the incoming signals so that bit synchronization is achieved. The bit rate pulses form the basic source of timing signals in the receiver and when produced correctly define the position of each bit in a data word during information extraction. Readout is accomplished in real time or during playback from magnetic tape recordings when time permits.

Accordingly, one object of the invention is to reconstruct bit rate pulses from an incoming PCM signal.

Another object of the invention is the provision of a synchronization circuit in which operational stability is maintained in the absence of level-changing input codes.

Yet another object of the invention is to provide a synchronization circuit in which desired accuracy and/or frequency regulation can be obtained.

Still another object of the invention is to reconstruct bit rate pulses from an incoming code characterized by amplitude changes between "1" and "0" levels.

To attain the foregoing objects a synchronization circuit constructed according to the invention receives PCM input signals in the non-return-to-zero mode and uses a voltage controlled clock oscillator running at an even multiple of the bit rate in the absence of code level changes of the input signals. By sensing changeovers in the pulse level of the code a trigger signal is produced. The rate at which trigger signals are produced is compared with the local oscillations by logic circuit means which impose a predetermined frequency division ratio and which generate a correction voltage operating on the local voltage controlled clock. The clock is acted on in an accelerating or delaying sense in accordance with the phase deviation of the bit rate in the master clock oscillator. By repeated comparison and correction until an in-phase condition is reached the synchronization circuit of the invention produces the locally required bit rate pulses.

Figure 2:
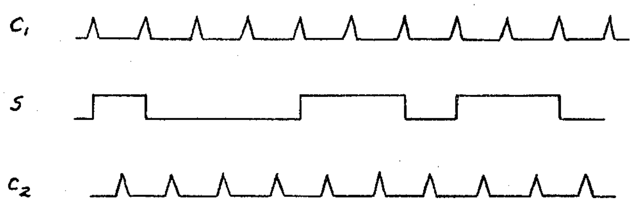
Figure 2:
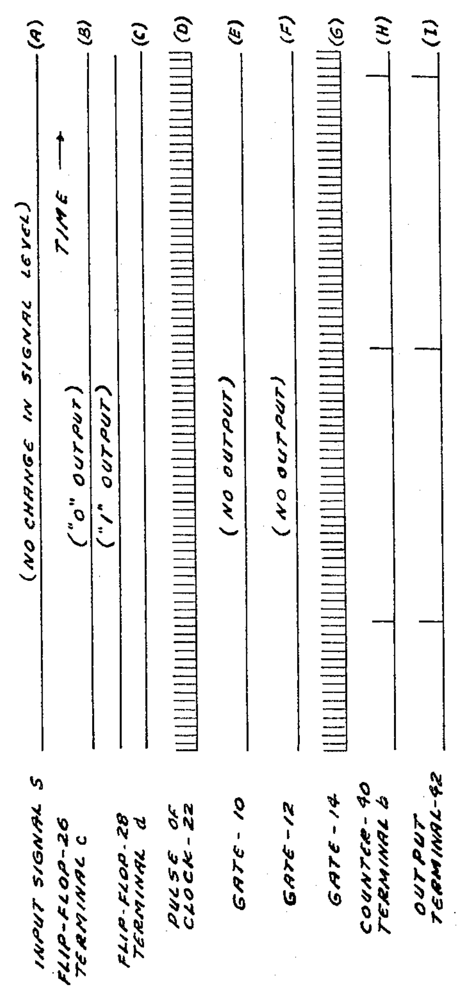

A complete understanding of the invention and an introduction to other objects and features not specifically mentioned may be had during the course of the following description when read in connection with the appended drawings in which:

FIG. 1 shows in block diagram form the pulse code modulated synchronization circuit of the invention; and FIGS. 2 and 3 show waveforms by which operation of the invention is more easily explained.

Referring now to the drawings, the circuit shown in FIG. 1 is adapted for the reception of pulse code modulated (PCM) telemetry signals in the non-return-to-zero mode, that is, a mode of transmission of "1" and "0" bits in which for each "1" to be transmitted the pulse level of the input signal changes with no change in pulse level during transmission of "0" signals. In FIG. 2 is shown a signal S in the non-return-to-zero mode synchronous to a clock rate waveform $C_1$ employed, for example, in pulse code modulated transmission. In explaining the operation of the circuit arrangement, it will be understood that the waveform $C_1$ is not produced in the circuit arrangement illustrated but, in reality, represents the master clock signal present in the test vehicle or airborne system whose telemetry is being monitored. As will be brought out in the following discussion, a clock image $C_2$ will be reconstructed from the signal S by the circuit arrangement of FIG. 1 for the purpose of providing an accurate timing reference. Proper evaluation of the data information contained in the signal S either during real time analysis or upon its extraction from recording apparatus may then follow.

The general organization of the FIG. 1 circuit includes a plurality of logic AND circuits 10, 12, 14, 16, 18 and 20, of the type well known in the art as having a single output which is energized when and only when every input is in an energized state. Each AND gate 10, 12, and 14 has an input connected to a voltage controlled clock pulse generator 22, by means of line 23. The clock pulse generator in turn receives an analog correction voltage from a digital-to-analog converter 24. AND gate 18 similarly has one input receiving the clock pulses of generator 22. Each AND gate 10, 12, and 14 has a second input derived from two flip-flops 26 and 28 which may be of many well-known types. Each flip-flop has input terminals *a* and *b* and output terminals *c* and *d*. Bistable multivibrators have been found suitable for use as the flip-flops so that, in the conventional manner, one or the other of the output terminals of each flip-flop is energized at any instant depending on which of its input terminals is energized. The selection of circuit parameters of flip-flops 26 and 28 will be assumed to energize output terminal *d* thereof in the absence in changes of pulse level of an incoming signal S. A single output terminal *c* of flip-flop 26 serves AND gate 10 as its second input. In a similar manner, the output terminals of flip-flop 28 serve to provide second inputs to AND gates 12 and 14, respectively.

It will be assumed that a remotely-generated wave S encoded into PCM bits forms the input to the system of the present invention. This wave is detected and applied to an input terminal 30 shown connecting with a trigger generator 32. In a conventional manner, a trigger pulse of short duration appears at the output of generator 32 each time the level of signal S changes. These trigger pulses are applied to input terminal *a* of flip-flop 26. The other input terminal *b* of flip-flop 26 is connected to a corresponding input terminal of flip-flop 28, which latter flip-flop has its other input terminal *a* connected to the output of AND gate 10. The two interconnected inputs of flip-flops 26 and 28 are fed by the output of AND gate 12. The output of AND gate 12 is further connected to the inputs of AND gates 16 and 20 and is also routed to one terminal, hereinafter referred to as the RESET terminal to correspond to the legend applied in FIG. 1, of a modulo 32 counter referenced 40. The other input terminal of counter 40, hereinafter called the COUNT terminal, is fed by the output of AND gate 14.

The modulo 32 counter 40 is one type of standard digital counter which advances from 0 to 31 in unit steps through a sequence of distinguishable states and then resets automatically to zero at the completion of the count interval ready for commencing another count. Thus, for each signal applied to the COUNT terminal an increasing count is registered. In the counter illustrated, if at any instant the count being registered lies between 0–7, or is at 15, or lies within the range 23–30, an output is produced at terminals *a*, *b*, and *c*, respectively. Considering the operation of counter 40 further, if, as the input signals on the COUNT terminal are being counted, a signal from AND gate 12 is applied to the RESET terminal the upward serial registration of the count is interrupted and the counter is automatically cleared to zero, thus giving the same effect as realized at the upper end of each count interval. In all cases, it will be understood that a prerequisite to the resumption of an advancing count is the presence of signals on the COUNT terminal.

Continuing with FIG. 1, the clock signal derived by the illustrated circuit arrangement appears at the output of AND gate 18 which feeds an output terminal 42. On the other hand, the outputs of AND gates 16 and 20 are applied to an UP-DOWN counter 43 of well-known operating characteristics. The output terminal of AND gate 16 is given the designation COUNT DOWN to signify the operative effect of its signal on counter 43. The legend COUNT UP has been applied to the output of AND gate 20 to describe similarly the operative significance of the output of AND gate 20.

The UP-DOWN counter 43 is simply a digital device with dual inputs and manifold outputs connected to provide a regulating voltage to digital-to-analog converter 24. In counter 43 for each signal impressed on the COUNT-UP terminal by AND gate 20 the next higher number is registered at the output terminals. A correspondingly greater digital input is registered at the input of converter 24. Reverse serial operation occurs from count down pulses produced by AND gate 16 whereby the magnitude of the digital output of counter 43 is reduced. The AND gates 16, 18 and 20 therefore constitute a selection network which generates COUNT-DOWN, OUTPUT, and COUNT-UP pulses depending on the state of counter 40 and the state of AND gate 12. The effect of counter 43 on converter 24 is to provide an increasing or decreasing digitally represented voltage in accordance with the outputs of AND gates 16 and 20 when these are made available. Converter 24 converts the count registered by the output terminals of counter 43 into a corresponding analog correction voltage.

In explaining the operation of the circuit arrangement it is assumed for illustrative purposes that signal S is derived from a clock signal waveform $C_1$ in turn derived from a clock rate oscillator which delivers a stable frequency sine wave signal at a frequency of 100 kc. This selection is within the usual bit rate values of PCM telemetry. Let it further be assumed that the voltage controlled clock 22 has a pulse rate 32 times greater than the rate of the clock rate oscillator producing the signal $C_1$. Clock 22 therefore operates at a nominal frequency of 3.2 mc. This latter rate, of course, is variable and may increase or decrease according to the magnitude and direction of the analog correction voltage.

It is convenient to consider separately the operation of the circuit ararngement under two conditions which are: (1) there is no change in the level of the input signal S and (2) when such change does occur. The first condition assumes the absence of a signal S. This simulates a constant input level which in fact is at the "0" level. No trigger pulse is produced by trigger generator 32. Flip-flops 26 and 28 therefore remain in the state wherein output terminals *d* thereof are energized. Clock pulses with a nominal frequency of 3.2 mc. are applied simultaneously to AND gates 10, 12, 14 and 18. AND gates 10 and 12 remain closed due to the lack of time coincident inputs. AND gate 14, however, passes each clock pulse which advances counter 40. Each time counter 40 reaches the state 15 the inputs of AND gate 18 are energized in time coincidence whence a pulse output appears at output terminal 42. Since each pulse from terminal *b* of counter 40 effectively causes AND gate 18 to pass an output to terminal 42 the output shows a pulse rate which is 1/32 of that of clock 22 or, in other words, a pulse rate of 100 kc. As long as neither of AND gates 16 and 20 receives an input from AND gate 12 no COUNT-DOWN or COUNT-UP pulses are generated and hence no change in frequency or phase of the output of clock pulse generator 22 takes place.

The operation just described may further be explained with the assistance of FIG. 3. FIG. 3(A) shows a signal S with no change in signal level. FIGS. 3(B) and 3(C) illustrate the no-signal conditions of flip-flops 26 and 28, respectively. Clock pulses from clock 22 recurring at the rate of 3.2 mc. are shown in FIG. 3(D). For convenience, the first clock pulse shown is assumed to arrive at AND gates 14 and 18 at the beginning of the count interval of counter 40. Coincident input signals to AND gate 14 from clock 22 and terminal *d* of flip-flop 28 result in the output from AND gate 14 shown in FIG. 3(G). FIGS. 3(D) and 3(I) illustrate the frequency relationship between the clock pulses and the output at terminal 42 due to the division ratio of counter 40. FIGS. 3(H) and 3(I) are, of course, precisely the same.

In considering the circuit behavior in the second condition outlined hereinabove, the manner in which the FIG. 1 circuit arrangement responds to a change in level of the signal S will first be explained. The change in signal level causes trigger circuit 32 to generate an output pulse which is impressed on terminal *a* of flip-flop 26. This sets flip-flop 26 to the state in which output terminal *c* is energized thereby providing AND gate 10 with one input. The next clock pulse passes AND gate 10 and acts on flip-flop 28 to energize its output terminal *c* whereupon AND gate 12 is supplied with one input. The following clock pulse passes AND gate 12 and in multiple fashion it resets counter 40, sets flip-flops 26 and 28 to have output terminals *d* thereof energized, and probes AND gates 16 and 20. When the frequency and phase of the output bit rate are correct RESET pulses occur coincident with a 31 count, the RESET pulses thus appear at times when counter 42 would, under normal circumstances, undergo transition from state 31 to state 0 by the effect of a 32 count pulse. Expressed differently, the pulse from clock 22 passes to the RESET terminal at the time counter 40 would otherwise automatically revert to the zero state by means of a COUNT pulse. Such transition is instead achieved by the RESET pulse, no COUNT pulse being available at this time due to the transition of flip-flop 28 caused by the output of AND gate 10. Pulses thereafter appearing on the COUNT terminal then reassume control of advancing the counter in the ordinary manner. Under the pattern of operation stated, no opportunity exists for time coincident inputs to either of AND gates 16 and 20. Consequently, synchronization is retained and the output bit rate remains constant until a correction due to changes in input frequency is necessary.

As previously explained, the clock pulse which is converted by AND gate 12 to a RESET pulse also simultaneously probes AND gates 16 and 20. Let it be assumed that counter 40 is registering in the range 23–30 at the time such RESET pulse appears. It will be apparent that AND gate 20 passes an output pulse to the COUNT-UP terminal of counter 43 thereby increasing the digital signal to converter 24. This indicates that counter 40 has not fully counted over the interval 0–31 since the last time it was reset to zero. Or, in other words, the pulse rate of clock 22 is too slow with respect to the bit rate contained in signal S. Counter 43 therefore counts up and converter 24 in turn acts on clock 22 in an accelerating sense which tends to increase the clock frequency beyond the nominal value of 3.2 mc. Further detecting the difference in the frequencies of clock 22 and the incoming bit rate leads to regulatory digital-to-analog corrections of the frequency of clock 22 as well as the phase shift. The end result is a clock signal $C_2$ at output terminal 42 synchronized both in phase and in frequency with that of the incoming information.

Conversely, if it is assumed that counter 40 is registering in the range 0–7 at the time a RESET pulse passes AND gate 12, it will be apparent that now AND gate 16 passes an output pulse to the COUNT-DOWN terminal of counter 43. The value of the digital signal to converter 24 now decreases which indicates that counter 40 has counted over the range 0–31. Stated differently, the pulse rate of clock 22 is too fast with respect to the incoming signal. In this case, the direction of deviation is to produce a corrective analog voltage which reduces the frequency of clock 22 sufficiently to achieve synchronization in phase and frequency of the oscillations of the clock train with the bit rate of the incoming information. In short, a decreasing count from counter 43 causes a corresponding reduction in the pulse rate of clock 22 whereas an increasing count similarly brings about an increase in the clock frequency. When equilibrium is reached the frequency of clock 22 is correct and the reconstructed clock wave appearing at terminal 42 is in exact synchronism with the incoming signal.

There has hereinabove been described a bit synchronization detector for obtaining bit rate synchronization which has the following advantages of providing instantaneous phase and frequency regulation over a wide range as well as any desired accuracy in phase and/or frequency regulation. Also available is a highly reliable and rapid response since correction for input frequency deviations occur at a rate proportional to the rate of deviation. Furthermore, it will be recognized that clock pulses and each level-changing input signal occurs in an extremely rapid fashion inasmuch as phase synchronization is established within an interval which is no greater than the duration of two successive clock pulse periods.

Although one embodiment of the invention has been illustrated and described, it will be apparent to those skilled in the art that various changes and modifications may be made without departing from the spirit of the invention or the scope of the appended claim.

We claim:

A circuit arrangement for achieving bit synchronization from a pulse code modulated input signal comprising:

a trigger generator receiving said input signal and producing a trigger pulse for each change in level of said input signal, first and second flip-flop circuits, a clock pulse generator of variable frequency, first, second and third AND gates each having one input from said generator, said first flip-flop having one input terminal receiving said trigger pulse and a second input terminal connected to a corresponding input terminal of said second flip-flop and the output of said second AND gate, said first flip-flop being switched to its alternate state each time said trigger pulse is applied thereto, said first and second AND gates having a second input from corresponding output terminals of said first and second flip-flops, respectively, said third AND gate having a second input from the output terminal of said second flip-flop, connecting means between the output of said first AND gate and the other input terminal of said second flip-flop, counting means for advancing in unit steps from a zero reference through an ordered sequence of distinguishable circuit output states and being reset automatically to zero reference each time the maximum count is registered, said counting means having one input terminal receiving the output of said third AND gate for causing the count to advance and a second input terminal receiving the output of said second AND gate for clearing said counter to zero reference, said counter being cleared to zero by the second clock signal which occurs following the setting of said first flip-flop to said alternate state whereby phase synchronization of said clock pulses and each of said level-changing signals is established within an interval which is no greater than the duration of two successive clock pulse periods, said counting means including first, second, and third output terminals for sequentially registering counts in the lower, medium, and higher regions of the count interval each time the count interval is traversed, fourth, fifth and sixth AND gates, said fourth and sixth AND gates each having an input connected to the output of said second gate and a second input, respectively, from the first and third output terminals of said counter, digital signal producing means receiving the outputs of said fourth and sixth AND gates for producing a decreasing digital signal when said fourth AND gate is open and an increasing digital signal when said sixth AND gate is open, and conversion means receiving said digital signal for producing an analog correction signal which accelerates or delays the oscillations of said clock pulse generator in accordance with said correction signal whereby bit synchronization between said input signal and the output bit rate of said fifth AND gate is achieved.

References Cited by the Examiner

UNITED STATES PATENTS

| | | | |
|---|---|---|---|
| 2,888,647 | 5/1959 | Beter | 340—347 |
| 3,042,911 | 7/1962 | Paradise | 340—347 |
| 3,142,802 | 7/1964 | Maure | 328—55 |

MAYNARD R. WILBUR, *Primary Examiner.*

ROBERT C. BAILEY, *Examiner.*

K. R. STEVENS, *Assistant Examiner.*